United States Patent
Radatti

(10) Patent No.: US 7,661,134 B2
(45) Date of Patent: Feb. 9, 2010

(54) APPARATUS, METHODS AND ARTICLES OF MANUFACTURE FOR SECURING COMPUTER NETWORKS

(75) Inventor: Peter V. Radatti, Conshohocken, PA (US)

(73) Assignee: CyberSoft, Inc., Conshohocken, PA (US)

( * ) Notice: Subject to any disclaimer, the term of this patent is extended or adjusted under 35 U.S.C. 154(b) by 875 days.

(21) Appl. No.: 10/032,251

(22) Filed: Dec. 21, 2001

(65) Prior Publication Data

US 2003/0120953 A1 Jun. 26, 2003

(51) Int. Cl.
*G06F 9/00* (2006.01)
*G06F 11/00* (2006.01)

(52) U.S. Cl. .............. 726/22; 726/11; 726/26
(58) Field of Classification Search ............. 713/201; 726/22, 11, 26
See application file for complete search history.

(56) References Cited

U.S. PATENT DOCUMENTS

| | | | | |
|---|---|---|---|---|
| 5,463,735 A * | 10/1995 | Pascucci et al. | ............ | 709/222 |
| 5,537,540 A * | 7/1996 | Miller et al. | ............ | 714/38 |
| 5,619,644 A * | 4/1997 | Crockett et al. | ............ | 714/45 |
| 5,944,821 A * | 8/1999 | Angelo | ............ | 713/200 |
| 6,021,510 A * | 2/2000 | Nachenberg | ............ | 714/38 |
| 6,092,194 A * | 7/2000 | Touboul | ............ | 726/24 |
| 6,145,012 A * | 11/2000 | Small | ............ | 709/246 |
| 6,195,432 B1 * | 2/2001 | Takahashi et al. | ............ | 380/277 |
| 6,233,589 B1 * | 5/2001 | Balcha et al. | ............ | 707/203 |
| 6,311,325 B1 * | 10/2001 | Levine et al. | ............ | 717/128 |
| 6,526,411 B1 * | 2/2003 | Ward | ............ | 707/102 |
| 6,594,665 B1 * | 7/2003 | Sowa et al. | ............ | 707/10 |
| 7,096,493 B1 * | 8/2006 | Liu | ............ | 726/8 |
| 2002/0035681 A1 * | 3/2002 | Maturana et al. | ............ | 713/151 |
| 2002/0138554 A1 * | 9/2002 | Feigen et al. | ............ | 709/203 |
| 2002/0188605 A1 * | 12/2002 | Adya et al. | ............ | 707/4 |

FOREIGN PATENT DOCUMENTS

JP 2001319018 A * 11/2001

OTHER PUBLICATIONS

IEEE 100, The Authoritative Dictionary of IEEE Standards Terms, Seventh Edition, 2000, p. 87.*
Menezes, Alfred et al., Handbook of Applied Cryptography, CRC Press 1997, pp. 22-23.*

* cited by examiner

*Primary Examiner*—Michael Pyzocha
*Assistant Examiner*—Emmanual L Moise
(74) *Attorney, Agent, or Firm*—John F. A. Earley, III; Frank J. Bonini, Jr.; Harding, Earley, Follmer & Frailey

(57) ABSTRACT

Apparatus, methods, and articles of manufacture are claimed for securing, maintaining, monitoring and controlling computer networks and clients located therein by use of client hash code tables, which are stored on a server. Clients subsequently provide client state codes which are compared to the hash code tables to ensure only acceptable client modifications have taken place. In the event of unacceptable client modifications, mechanisms are used to notify appropriate resources.

19 Claims, 1 Drawing Sheet

Figure 1:
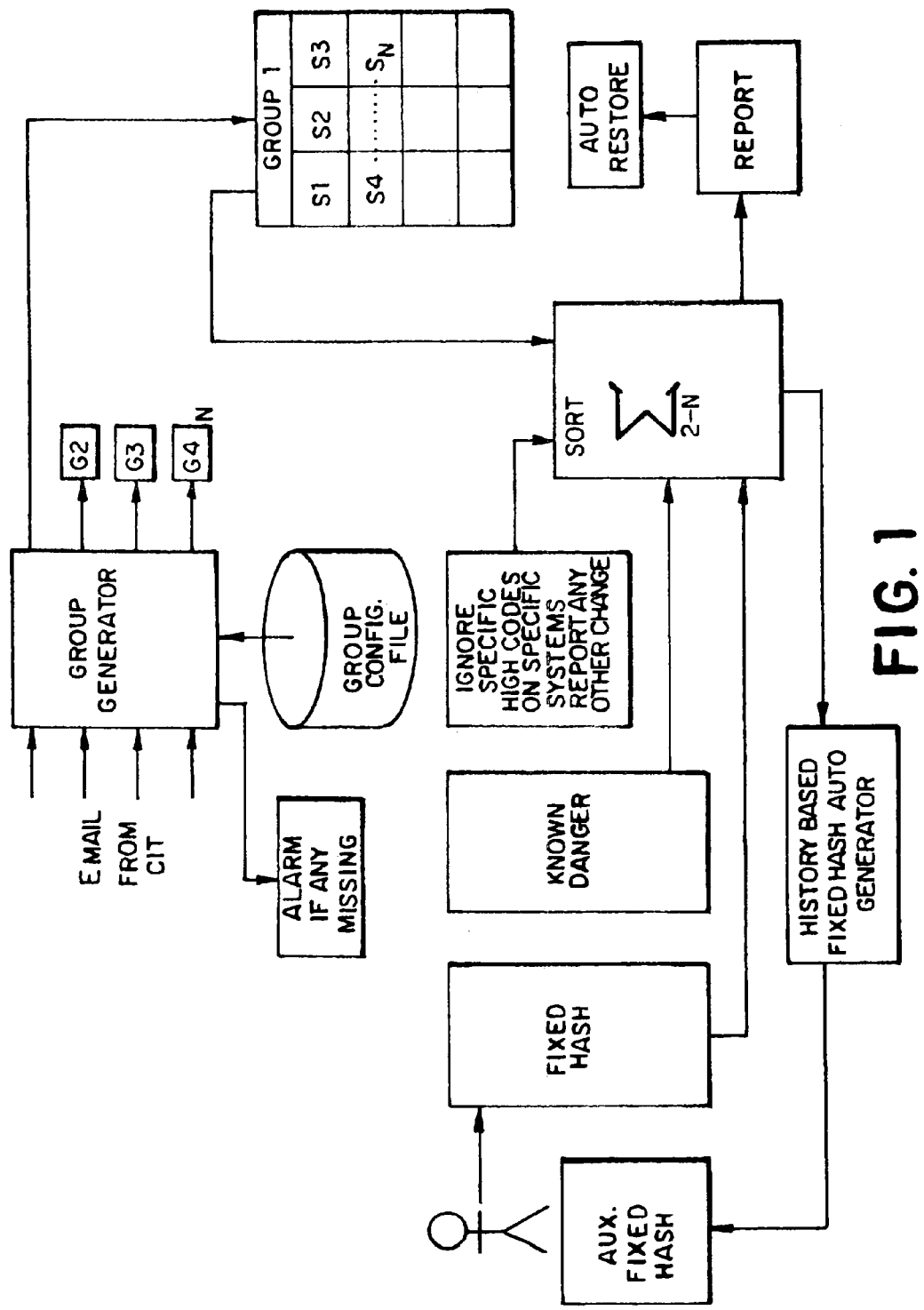

APPARATUS, METHODS AND ARTICLES OF MANUFACTURE FOR SECURING COMPUTER NETWORKS

FIELD OF THE INVENTION

The present invention relates to apparatus, methods and articles of manufacture for securing and maintaining computer networks. More particularly, the present invention relates to apparatus and methods for securing, maintaining, monitoring and controlling networks, systems, and files.

BACKGROUND OF THE INVENTION

Securing, maintaining, monitoring and controlling one or more computer networks, as well as the systems in the network, is a difficult task, especially in an enterprise. System and network administrators, trying to constantly secure networks, maintain networks, monitor networks and control networks, as well as secure systems on any networks, maintain systems on any networks, monitor systems on any networks and control systems on any networks may be overwhelmed.

Securing computer networks and their systems is difficult because of internal and external threats. Internal threats are the greatest danger to computer security. It is estimated that eighty percent of security problems have internal causes. Internal causes may be many and varied. For example, disgruntled employees can wreak havoc on computer networks and their systems. Security problems do not have to be caused by intentional acts, either. Careless employees can damage and destroy networks and their systems.

The remaining twenty percent of security problems have external causes. These external problems may be many and varied as well, for example, viruses and hackers constitute an all-too-real threat to computer networks and their systems.

Maintaining computer networks and their systems is difficult because of the complicated and intertwined nature of computer networks. Voluminous files, multiple platforms, lack of standardization among vendors, frequent conflicts among software, maintaining updates etc. can cause all sorts of difficulties for computer network and system maintenance.

Securing, maintaining, monitoring and controlling computer networks and their systems is complicated by the difficulty of tracking any network and/or system problems. A network administrator may simply be unable to locate the problem because of the complicated and intertwined nature of modern computer networks. Finding an internal security threat, such as a malicious employee who uses another employee's system to corrupt systems and/or the network may be impossible.

Security threats are constantly changing. New security vulnerabilities are constantly being discovered in system and network software, and may be exploited by employees or others. New viruses are constantly being written and released. Systems and networks can be protected against newly discovered vulnerabilities and viruses usually only after the vulnerability or virus is recognized. It is sometimes possible to guard against vulnerabilities or viruses by attempting to recognize threatening characteristics, such as telltale behavior, code sequences and the like, however, this type of detection (usually referred to as "heuristics detection,") is limited and not always accurate. Thus, frequent updates of security mechanisms, such as installing system and network patches, updating virus definitions regularly, etc. are necessary.

There are various tools in the prior art that attempt to secure, maintain, monitor and control systems and networks. These tools suffer from many deficiencies. First, they are usually not designed to perform all the functions of securing, maintaining, monitoring and controlling systems and networks. Thus the user must obtain and install a number of tools for each function. Next, the tools may themselves bring their own set of security, maintenance, etc. problems to the network or its systems, as might be the case when an antivirus program conflicts with a network monitoring program. Moreover, maintaining the tools themselves can become as separate system and network chore, as the tools must constantly be updated to deal with newly discovered security threats.

The majority of system and network protection and maintenance tools also lack platform independence. That is, they are often designed to interface with one particular platform or operating system. By being limited to a particular operating system, protection on different platforms, such as might occur in an enterprise with UNIX, Windows, and mainframe platforms, may become very complicated.

Accordingly, it is an object of the present invention to provide methods, apparatus and articles of manufacture that secure, maintain, monitor and control computer networks, including systems in networks.

It is a further object of the present invention to provide methods, apparatus and articles of manufacture that secure, maintain, monitor and control computer networks, including systems in networks, without needing frequent updates.

It is a further object of the present invention to provide methods, apparatus and articles of manufacture that secure, maintain, monitor and control computer networks, including systems in networks, across a variety of platforms.

SUMMARY OF THE INVENTION

The preferred embodiments comprise methods, apparatus, and articles of manufacture for securing, maintaining, monitoring and controlling systems and networks. In the preferred embodiments, one or more secure hash code table(s) of the systems on the networks is generated. The secure hash code table may be generated through any or all of a number of methods. The secure hash code table provides a baseline for the network and the systems on the network.

At intervals, a comparison cycle occurs. One or more systems on the networks transmit a client state code. The client state code is compared to the secure hash code table value. If the client state code does not deviate from the secure hash code table value, or, in some embodiments, if the deviation is within acceptable ranges, then no action will be taken. If, however, there is deviation by an unacceptable amount, various alerting mechanisms will be triggered.

In certain preferred embodiments, a system repair method may be utilized through use of automated alert mechanisms and auto repair functions.

BRIEF DESCRIPTION OF THE DRAWING FIGURES

FIG. 1 is a schematic diagram illustrating an example of steps used in connection with carrying out the invention.

DETAILED DESCRIPTION OF THE PREFERRED EMBODIMENTS

The preferred embodiments comprise methods, apparatus, and articles of manufacture for securing, maintaining, monitoring and controlling systems and networks. In the preferred embodiments, one or more secure hash code table(s) of the systems on the networks is initially generated. A secure hash code table is comprised of secure client hash code values, and, as further described below, will provide a baseline for the system, and in turn, any networks, as will be described further below.

A secure hash code table may be constructed through one or more of the following methods. It should be noted that these methods are not exclusive, and any or all may be used in various preferred embodiments.

Method 1 for constructing secure hash code table. If a number of identical clients are present on the network, hash values are calculated for the files present on the clients. For example, one of the identical clients may consist of 14 files with 14 separate hash codes, therefore all the clients should have an identical 14 files with 14 identical hash codes. These file names and their codes are concatenated and stored in a secure hash code table.

Method 2 for constructing secure hash code table. If identical files are present on clients on the network, but the clients themselves are not identical, hash values are calculated for the files. For example, a file name of a file present on various clients, along with its hash code, is stored in a secure hash code file table. File names and hash codes may then be referenced as needed from the secure hash code file table, as will be further described below.

Method 3 for constructing secure hash code table. If proscribed code is preidentified, then proscribed code file names and hash values may be stored in a secure hash code proscribed code table. Proscribed code file names and hash codes may then be referenced as needed from the secure hash code proscribed code table, as will be further described below.

Method 4 for constructing secure hash code table. A secure hash code table may also be constructed from the clients on the network through one or more compiled client hash values. In order to construct the compiled client hash values, clients first transmit a system state data file to a server. In the especially preferred embodiments, this is one or more secure system state data file(s) as described in co-pending U.S. patent application "Apparatus, Methods And Articles Of Manufacture For Securing And Maintaining Computer Systems And Storage Media," by Peter V. Radatti, Ser. No. 10/032,252, filed Dec. 21, 2001.

A grouping component groups the various secure system state data files into client groups. In the preferred embodiments these are logical client groups: like clients are grouped with like clients, e.g., all Sun SPARC Solaris 8.0 clients are grouped into a Sun SPARC Solaris 8.0 group, all Windows 95B clients are grouped into a Windows 95B group, etc. Of course in other embodiments, other client groups may be used as desired, and their construction may be based on any desired parameters, including single machine groups, workgroup groups, etc.

Once logical client groups are established, secure hash code table values are built from modal values. For example, a Sun SPARC Solaris 8.0 secure hash code table value is built from an modal hash code of all the Sun SPARC Solaris 8.0 clients' secure state system data files.

For example, if a group consists of eight Sun SPARC Solaris 8.0 machines, and the secure system state data file hash value of systems 1-7 equal 42, and the secure system state data file hash value of system 8 equals 43, then the modal value will be 42, and the secure hash code table will contain that value for the group. In other words, if the modal of all Sun SPARC Solaris 8.0 secure state system hashes equals x, then x is the Sun SPARC Solaris 8.0 secure logical data group hash value. The secure logical data group hash values are then stored in a secure hash code table.

Method 5 for constructing secure hash code table. A secure hash code table may also be constructed from predetermined hash values. For example, a desired hash value for a client may be predetermined, such as a Sun SPARC Solaris 8.0 hash value for a secure Sun SPARC Solaris 8.0 client, which would contain the desired OS, any applications, etc. As another example, predetermined hash values for particular code may be established, such as a hash value for OS code a, OS code b, OS code a with patch 1, application a, application b, data a, data b, etc.

Method 6 for constructing secure hash code table. Various groups, e.g. a Sun SPARC Solaris 8.0 group, may or may not be established. In either event, an exemplary system is created. If groups are established, an exemplary system for each group is created. The exemplary system or systems serve as the baseline for all systems. Hash values are derived, and a secure hash code table is constructed, from the exemplary system or systems. Of course, if more than one exemplary system is created a number of secure hash code tables, one for each exemplary system, is created.

Method 7 for constructing secure hash code table. With this method, the hash code calculation is isolated from the client systems. The client system transmits file names and hash values of the desired material to be secured. The desired material to be secured may be all files on the system, or, some other file or desired set(s) of files. A server calculates hash code values for a system and/or its files. This method may provide a higher level of security by isolating the hash code calculation from potentially affected systems. This method further may simplify maintenance as well by requiring only a single hash code calculation application to be maintained and updated, rather than requiring hash code applications on a number of clients to be maintained and updated.

Method 8 for constructing secure hash code table. A secure hash code table may also be constructed through systems "as is." That is, a baseline secure value may be constructed from machines on the network, without any pre-baseline proceedings, e.g. security checks. In the embodiments of this method, baseline values are gathered over time, until modal values are clearly defined, before establishing a secure hash code table for later use. So for example, if a network consists of one thousand machines, and 500 return a hash value of x, 400 of x+10, and the remaining 100 of x+100, it may be desired to run more than one baseline series over time, ensuring that the values are understandable before using them in a secure hash code table. Additionally, assuming many, different system values across a range are obtained, it may be desired to run a number of baselines over time until clearly established modal values arise from the runs, which then may be used in subsequent comparisons.

Of course, if baseline values arise that are curious and/or unexpected, exemplary machines of each value could be pulled and tested so that a desired value is achieved from a desired system, and then used in generating a secure hash code table. If the examination process reveals understandable variation for a particular file or file(s), those file(s) may be noted as within known or acceptable values, marked as to be excluded in subsequent examinations, etc.

It should be noted that these methods are not exclusive, and one or more may be used to construct one or more secure hash code table(s). Additionally, partial secure hash code table(s) may be constructed. For example, it may be desired to generate a partial secure hash code table in order to only secure parts of a system, that is, to generate a hash code table of desired file(s) or directory(ies.) In such an event, a designated file or files, directory or directories, etc. on a system or systems may be hashed and a secure hash code table generated from the hash value or values. Additionally, a predetermined and/or existing secure hash code table(s) may be used if desired.

It should be noted that when any system(s), partial system(s) and/or file(s) are selected to create the secure hash code table, the user may desire to exclude predefined file(s) and/or directories from the construction. Such exclusion could occur automatically or manually, e.g., automatically excluding all file(s) that might alter the modal value within certain parameters. As another example, a user may desire to exclude system files that he has no interest in securing and that are modified as a matter of course.

Files, directories or system hash values may be generated in a number of ways as known in the art. It should be noted that multiple hash code values, using one or more hash code table values, may be constructed and used in comparison cycles.

The secure hash code table or tables are used as a baseline in the preferred embodiments. At desired intervals, a comparison cycle begins. At a predetermined time or within a predetermined time frame, a client connects with a server. In the preferred embodiment, this is a secure connection, e.g. SSL, encrypted email, etc. The connection has code transfer capability through any means known in the art, e.g., email, LAN, WAN, VPN, Internet, etc.

Systems may be referred to herein as a "client," as the term will possibly help in described the embodiments of the invention. However, it should be specifically understood that a client-server relationship is not necessary for any embodiment of the present invention, and that "client" is used herein as a general term to indicate any system that is to be secured, maintained, monitored and controlled. Similarly, "server" is used herein as a general term to indicate any system that maintains a baseline for a client.

The connection may be synchronous, e.g. SSL, or asynchronous, e.g., email. Each client is authenticated upon connection. Authentication can occur in a number of ways, including onetime authentication, serialized onetime authentication, etc. If the client fails to connect at the predetermined time and/or authenticate upon connection, an alarm component generates an alarm. Of course, other reporting, logging, reactive and/or alerting mechanisms may be used as well.

The connection may transmit any type of code for authentication. For example the NIC address, processor serial number, Ethernet address, MAC address, etc. could all be used to minimize the possibility of duplication and ensure client security. In some preferred embodiments, authentication is through a one-time password algorithm known by the client and server, but unknown to other systems.

Once the client is authenticated, it transmits a client state code to the server. Alternatively, the client state code is transmitted along with authentication. This client state code may be a comparison data file, such as referred to in co-pending U.S. patent application "Apparatus, Methods and Articles of Manufacture for Securing and Maintaining Computer Systems and Storage Media," by Peter V. Radatti, Ser. No. 10/032,252, filed on Dec. 21, 2001, and/or a secure state system data file and/or an alternate data file, also referred to in co-pending U.S. patent application "Apparatus, Methods And Articles Of Manufacture For Securing And Maintaining Computer Systems And Storage Media," by Peter V. Radatti, Ser. No. 10/032,252, filed Dec. 21, 2001, and/or some other client security data file.

Generally, the method used to construct the client state code should be the same method as the method used to construct the secure hash code table initially. However, if identical hash values are obtained by different methods, different methods may be used. If, as has been described above, predefined file(s) and/or directories had been excluded from the system(s), partial system(s) and/or files to create the secure hash code table, the same should be subtracted from the client state code. Such exclusion could occur automatically or manually, e.g., automatically excluding all file(s) that might alter the modal value within certain parameters. As another example, a user may desire to exclude system files that he has no interest in securing and that are modified as a matter of course.

Additionally, it may be desired to alternate methods. For example, more than one secure hash code tables may be constructed through more than one method and subsequent comparison(s), using compatible methods, may be made to one or more of these multiple secure hash code tables. This type of process might be especially desirable for a number of reasons, e.g., when high levels of security are desired.

It may also be desirable to alternate partial and full system comparisons using methods to construct partial and full secure hash code tables. For example, baseline system secure hash code tables may be constructed, followed by baseline modified secure hash code tables. In such a manner, modified files would be checked more frequently than the entire system. Such a process would minimize the time required to maintain security as entire system and network processing could take longer and use more system and network resources than partial system and network processing.

As another embodiment, it may also be desired to construct secure hash code table(s) of desired groups of systems. For example, if systems A, B, C, D, E are desired to be secured, a secure hash code table could be constructed of group A and B, and used in subsequent client state comparisons. A second secure hash code table could be constructed of group A, B, C, D and E, and also used in subsequent client state comparisons.

Thus, many different hash code comparisons may be constructed as desired, and the terms "secure hash code table," "client state code" and "client state comparison" are intended to include the range of values from a single file on a client through any desired groups of systems. It should also be noted that client state comparisons may be performed in any desired manner or manners throughout these ranges, so that, for example, a client state comparison of an entire system may be followed by a client state comparison of a desired file, which may be followed by a client state comparison of a desired directory, etc. As another example, simultaneous or nearly client state comparisons of different ranges may be desired (e.g., using a system client state comparison and a system group comparison.)

It should also be noted that multiple servers may be used. For example, cross-checking is accomplished by client state comparisons using different hash code values on different servers. Any combination desired may be used.

It should be noted that once the baseline state is established, new machines can be brought into the network without having contributed to the appropriate baseline. The new machines can be tested for compliance with the appropriate baseline. Thus embodiments of the present invention make it possible to secure previously unknown machines. For example, if a group consists of eight Sun SPARC Solaris 8.0 machines, and the secure system state data file hash value of systems 1-7 equal 42, and the secure system state data file hash value of system 8 equals 43, then the modal value will be 42, and the secure hash code table will contain that value for the group. A client state comparison will then be run, of a new Sun SPARC Solaris 8.0 system added to a network. If the client state code of the new system is 42, then, the machine is presumed secure. On the other hand, if the client state code is 43, then the machine is presumed insecure, and any desired actions will be taken, as is further described below.

Once a client state code—in this example a complete system hash comprised of the operating system on the client as well as all executable and data files—is generated and transmitted to the server, the server identifies each client as belonging within a particular logical client group according to parameters for the client found within a Group Configuration File. Each client state code is compared to the secure logical data group hash values maintained in the secure hash code table. If the client state code is identical to the secure logical data group hash value, then the client is presumed to be secure. If the client state code is not identical to the secure logical data group hash value, then one of two actions may be taken.

If the difference between the client state code and the secure logical data group hash value is within an acceptable, predetermined parameter(s), then the client is presumed to be secure. For example, an additional file may create a difference between the values, but the difference may be minimal enough to indicate it is an acceptable variation. Of course, in certain comparisons there may be no permitted deviation from the secure logical data group hash value.

If the difference between the client state code and the secure logical data group hash value is outside an acceptable, predetermined parameter(s), or, if no acceptable, predetermined parameter(s) is established, then the client is presumed to be insecure. An insecure client may result in a number of actions, such as initiating a client status mechanism, which may comprise, in the preferred embodiments, reporting, logging, reactive and/or alerting mechanisms. For example, an insecure alert may be generated, a network administrator may be warned, the client may be taken offline until its status ascertained, the system scanned by a proscribed code scanner, etc. In one especially preferred embodiment, the server may activate an Auto Restore component which will reestablish a secure client through code comprising a secure client of the client's group. A number of methods may be used to reestablish a secure client state. For example, secure code may be present on the system and activated on the system, secure code may be transmitted to the system, secure code may be manually installed, code may be sent to an proscribed code scanner before being installed, etc.

It should be noted that it is not necessary that the comparison cycle be of a system within a group. As noted above, the secure hash value may be constructed through a number of methods. Some of the methods may not be used in the construction of a secure logical data group hash value, but rather construct secure data hash values. These hash values, ungrouped, may be used as subsequent baseline values for system comparison.

Embodiments of the present invention provide security through minimal user interaction. The systems on the network provide the secure values. Each system is a comparison standard for all systems. The systems that do not compare appropriately are suspect systems. Thus embodiments of the present invention may be included in a network or enterprise wide security system as it promotes checks and balances between administrative and security personnel. The system administrators, who might have total control over their systems, have no final authority. Rather, a network administrator or security administrator has final authority. Moreover, there is no need for contact between the system administrator and network/security administrator in order to operate the embodiments. This promotes increased security, makes the embodiments useable across larger networks, etc.

Embodiments of the present invention may be deployed among networks containing large numbers of machines. In such embodiments the comparison cycle might be accelerated by "pre-editing" the system hash. For example, one embodiment pre-edits the client hashes by sorting and merging the client hashes together by filename in hash code. All like files are ignored. Any files remaining that deviate from the modal value for those files would be suspect, and reporting, logging, reactive and/or alerting mechanisms could be implemented.

In addition to a secure hash code table, a comparison cycle might also include, in certain embodiments, one or more other alternative hash code tables for client comparison. For example, a hash code table containing known dangerous code might also be employed for comparison. Those files that are not secured are compared against the known dangerous hash code table. If the hash values match, reporting, logging, reactive and/or alerting mechanisms may be employed. Any such known dangerous code hash values maybe generated through a number of ways, such as hashing known proscribed code, etc. One especially preferred method of generating such known dangerous code hash values is to generate values for network systems known to possess security vulnerabilities, and so have a baseline for comprised machine.

As noted above, embodiments of the present intention may be deployed among distributed systems and networks as well. This will reduce the processor load on any individual client or server. Shared and/or multiple secure hash code tables might be used in distributed servers as well. Of course, any server should be secured.

All types of networks, and network devices contained therein, may be protected using embodiments of the present invention. Additionally, system and network maintenance may be simplified as well using embodiments of the present invention. For example, hash values of code may be transmitted to a server and used to ensure that the code is the desired version by comparing the code hash value with a code table data file. If the value is inconsistent with the code table data file, actions such as notification, installation of updated code, etc. may occur.

Embodiments of the present invention may be used in any microprocessor or microcontroller system, as well as any circuitry containing code (e.g. Flash ROM) that is desired to be secured or maintained through a connection to a server. The term "client" is to be interpreted herein broadly enough to include these types of device, and "network" is to be interpreted herein broadly enough to include this type of connection. For example, a network device such as a personal digital assistants may be secured and/or maintained through embodiments of the present invention, as well as network devices such as cell phones, digital appliances, etc. A constant connection to a server is not necessary. Regular, irregular, predetermined, random, real time, etc. connections may be made to a server and the comparison cycle may take place during those connections.

An especially preferred embodiment of the present invention runs on a Unix® such as System V, Sun Solaris®, IBM AIX®, HP-UX®, etc. The description of the preferred embodiments uses Sun Solaris® operating system Unix® terminology. However, it should be specifically understood that embodiments can be implemented in other Unix® and Unix®-like platforms, including but not limited to Linux® and its variants, as well as other operating system platforms including but not limited to Microsoft Windows® NT, Windows® 2000, Windows® 95, 98 and Me, IBM MVS, IBM OS/390, SNA, 3270 RJE, MacOS, VxWorks® and others.

In alternate embodiments, the invention comprises an article of manufacture, or signal-bearing medium, containing computer readable code. Examples of such articles include tarred code and other types and/or methods of storing, archiving and/or compressing code known in the art, contained on any media known in the art, such as CD-ROM's, floppy disks, etc.

The above description and the views and material depicted by the figures are for purposes of illustration only and are not intended to be, and should not be construed as, limitations on the invention. Moreover, certain modifications or alternatives may suggest themselves to those skilled in the art upon reading of this specification, all of which are intended to be within the spirit and scope of the present invention as defined in the attached claims.

The invention claimed is:

1. A method for securing, maintaining, monitoring and controlling computer networks and clients located therein, comprising: providing a hash code table of a client said hash code table being provided for storing a plurality of files; providing a client state code of a client; comparing said client state code to said hash code table, and generating an alert mechanism when a deviation threshold is reached based on a deviation between said hash code table values for said client and said client state code;
   wherein said hash code table includes the hash codes for files on computers within the network that are to be secured;
   the method further including:
   transmitting across a network from clients located in the network a client state code;
   providing at least one server within the network assigned to recognize said client state code transmission,
   wherein said server maintains a baseline for said client, and
   wherein said baseline comprises said hash code table of a said client;
   wherein the step of providing a hash code table of a network device further comprises providing a secure hash code table;
   wherein the step of providing a secure hash code table further comprises generating a secure hash code table; and
   wherein the step of generating a secure hash code table further comprises generating a secure hash code table using at least one compiled client hash value, wherein said compiled client hash value is generated by: providing a secure system state data file; grouping said secure system data file into one or more groups; and, extracting the modal hash value from any of said groups.

2. A method as in claim 1 further comprising the step of reporting the results of said comparison.

3. A method as in claim 1 further comprising the step of logging the results of said comparison.

4. A method as in claim 1 further comprising the step of securing a client in lock down mode.

5. A method as in claim 1 further comprising the step of initiating a client status mechanism.

6. A method as in claim 1 further comprising the step of initiating an Auto Restore component.

7. A method as in claim 1 wherein the step of providing a client state code further comprises generating a client state code.

8. The method of claim 1, wherein said clients within said network are identical clients, and wherein said client state codes of the said identical clients are identical.

9. The method of claim 1, wherein said clients within said network have one or more files present thereon which are common to one or more clients on said network, said files,
   wherein said hash code table includes file names and hash codes which are concatenated and stored in said table.

10. The method of claim 1, wherein said method involves initiating a client process from a computer, and wherein providing a hash code table of a client comprises providing a hash code table for the computer from which the client process was initiated.

11. The method of claim 1, wherein the client state code is transmitted along with authentication.

12. A computer storage component including software containing the hash code table generated by a method for securing, maintaining, monitoring and controlling computer networks and clients located therein, comprising: providing a hash code table of a client said hash code table being provided for storing a plurality of files; providing a client state code of a client; comparing said client state code to said hash code table, and generating an alert mechanism when a deviation threshold is reached based on a deviation between said hash code table values for said client and said client state code;
   wherein said hash code table includes the hash codes for files on computers within the network that are to be secured;
   the method further including:
   transmitting across a network from clients located in the network a client state code;
   providing at least one server within the network assigned to recognize said client state code transmission,
   wherein said server maintains a baseline for said client, and
   wherein said baseline comprises said hash code table of a said client; wherein the step of providing a hash code table of a network device further comprises providing a secure hash code table;
   wherein the step of providing a secure hash code table further comprises generating a secure hash code table; and
   wherein the step of generating a secure hash code table further comprises generating a secure hash code table using at least one compiled client hash value, wherein said compiled client hash value is generated by: providing a secure system state data file; grouping said secure system data file into one or more groups; and, extracting the modal hash value from any of said groups.

13. The computer storage component of claim 12,
   wherein the step of generating a secure hash code table further comprises generating a secure hash code table using at least one compiled client hash value.

14. The computer storage component of claim 12,
   wherein the stop of generating a secure hash code table further comprises generating a secure hash code table using at least one exemplary system.

15. The computer storage component of claim 12,
   wherein the step of generating a secure hash code table further comprises generating a secure hash code table using at least one baseline secure value.

16. A method for securing, maintaining, monitoring and controlling computer networks and clients located therein, comprising: providing a hash code table of a client on at least one storage component of a computer network device or client; providing a client state code of a client on at least one storage component of a computer network device or client;
   comparing said client state code to said hash code table, wherein said hash code table is operable for one or more client platforms;

wherein providing a hash code table includes gathering baseline values to define modal values and generating said hash code table using said defined modal values, wherein each of said clients uses the same or different operating platform as another of said client, and wherein regardless of the operating platform used by a said client, said client state code is compared to said generated hash code table.

17. A method for securing, maintaining, monitoring and controlling computer networks and clients located therein, comprising: providing a network of computing components, including at least a plurality of clients, and at least one server; providing a hash code table of a client said hash code table being provided for storing a plurality of files; providing a client state code of a client; comparing said client state code to said hash code table, and generating an alert mechanism when a deviation threshold is reached based on a deviation between said hash code table values for said client and said client state code;

wherein said hash code table includes the hash codes for files on computers within the network that are to be secured;

the method further including:

transmitting across a network from clients located in the network a client state code;

providing at least one server within the network assigned to recognize said client state code transmission, wherein said server maintains a baseline for said client, and wherein said baseline comprises said hash code table of a said client;

wherein the step of providing a hash code table of a network device further comprises providing a secure hash code table;

wherein the step of providing a secure hash code table further comprises generating a secure hash code table; and wherein the step of generating a secure hash code table further comprises generating a secure hash code table using at least one compiled client hash value, wherein said compiled client hash value is generated by: providing a secure system state data file; grouping said secure system data file into one or more groups; and, extracting the modal hash value from any of said groups.

18. A computer storage component including software containing the hash code table generated by a method for securing, maintaining, monitoring and controlling computer networks and clients located therein, comprising: providing a network of computing components, including at least a plurality of clients, and at least one server; providing a hash code table of a client said hash code table being provided for storing a plurality of files; providing a client state code of a client; comparing said client state code to said hash code table, and generating an alert mechanism when a deviation threshold is reached based on a deviation between said hash code table values for said client and said client state code;

wherein said hash code table includes the hash codes for files on computers within the network that are to be secured;

the method further including:

transmitting across a network from clients located in the network a client state code;

providing at least one server within the network assigned to recognize said client state code transmission, wherein said server maintains a baseline for said client, and wherein said baseline comprises said hash code table of a said client; wherein the step of providing a hash code table of a network device further comprises providing a secure hash code table;

wherein the step of providing a secure hash code table further comprises generating a secure hash code table; and wherein the step of generating a secure hash code table further comprises generating a secure hash code table using at least one compiled client hash value, wherein said compiled client hash value is generated by: providing a secure system state data file; grouping said secure system data file into one or more groups; and, extracting the modal hash value from any of said groups.

19. A method for securing, maintaining, monitoring and controlling computer networks and clients located therein, comprising: providing a network of computing components, including at least a plurality of clients, and at least one server; providing a hash code table of a client on at least one storage component of a computer network device or client; providing a client state code of a client on at least one storage component of a computer network device or client;

comparing said client state code to said hash code table, wherein said hash code table is operable for one or more client platforms;

wherein providing a hash code table includes gathering baseline values to define modal values and generating said hash code table using said defined modal values, wherein each of said clients uses the same or different operating platform as another of said client, and wherein regardless of the operating platform used by a said client, said client state code is compared to said generated hash code table.

* * * * *